United States Patent
Peña Monferrer et al.

(10) Patent No.: US 12,152,978 B2
(45) Date of Patent: Nov. 26, 2024

(54) CONTROLLING A MULTIPHASE FLOW

(71) Applicant: International Business Machines Corporation, Armonk, NY (US)

(72) Inventors: Carlos Peña Monferrer, Warrington (GB); Lan Ngoc Hoang, Lymm (GB); Eloisa Bentivegna, Warrington (GB); Mohab Elkaref, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 17/108,362

(22) Filed: Dec. 1, 2020

(65) Prior Publication Data

US 2022/0170840 A1 Jun. 2, 2022

(51) Int. Cl.
*G01N 15/10* (2024.01)
*G06N 3/08* (2023.01)
(Continued)

(52) U.S. Cl.
CPC ........... *G01N 15/1012* (2013.01); *G06N 3/08* (2013.01); *G06T 7/0002* (2013.01); *G06T 15/005* (2013.01); *G01N 2015/1016* (2024.01)

(58) Field of Classification Search
CPC ........... G01N 15/1459; G01N 15/1012; G01N 15/1429; G01N 15/1433; G01N 15/0227; G01N 2015/0026; G01N 2015/0053; G01N 2015/0011; G01N 2015/1493; G01N 2015/1016; G01N 2015/0294; G06N 3/08; G06N 3/045; G06T 7/0002; G06T 17/00; G06T 7/00; G06T 15/506; G06T 15/005; G06T 15/06; G06T 2207/20081; G06T 2207/20076; G06T 2210/02; G06T 2207/20084; G06T 2207/10016

See application file for complete search history.

(56) References Cited

U.S. PATENT DOCUMENTS

| 5,121,629 A | 6/1992 | Alba |
| 6,289,299 B1 | 9/2001 | Daniel, Jr. et al. |

(Continued)

FOREIGN PATENT DOCUMENTS

| CN | 105571998 A | 5/2016 |
| DE | 19954702 A1 | 5/2001 |

OTHER PUBLICATIONS

Fu, Yucheng, "Development of Advanced Image Processing Algorithms for Bubbly Flow Measurement", Doctor of Philosophy Dissertation, Virginia Tech, Oct. 16, 2018, 122 pages, <https://vtechworks.lib.vt.edu/handle/10919/85390>.

(Continued)

*Primary Examiner* — Shogo Sasaki
(74) *Attorney, Agent, or Firm* — Edward J. Wixted, III

(57) ABSTRACT

In an approach for controlling a multiphase flow configured to create a plurality of particles, a processor obtains images of a plurality of particles in a multiphase flow. A processor provides the images to a neural network adapted to determine a distribution of a spatial property of the plurality of particles from the provided images. A processor determines the distribution of the spatial property of the plurality of particles in the multiphase flow, based on the provided images, using the neural network. A processor controls the multiphase flow based on the determined distribution.

19 Claims, 9 Drawing Sheets

(51) Int. Cl.
　　　*G06T 7/00*　　　　(2017.01)
　　　*G06T 15/00*　　　(2011.01)

(56)　　　　　References Cited

U.S. PATENT DOCUMENTS

| | | | |
|---|---|---|---|
| 8,691,164 B2 * | 4/2014 | Butler | G01N 33/5005 |
| | | | 422/503 |
| 8,805,586 B2 * | 8/2014 | Runkana | B01J 19/0033 |
| | | | 977/773 |
| 9,759,343 B2 | 9/2017 | Peret et al. | |
| 2018/0052088 A1 | 2/2018 | Sarkar et al. | |
| 2018/0173218 A1 | 6/2018 | Dinu et al. | |
| 2019/0356740 A1 | 11/2019 | Yuan et al. | |

OTHER PUBLICATIONS

Montes-Atenas et al. "Predicting Bubble Size and Bubble Rate Data in Water And In Froth Flotation-Like Slurry From Computational Fluid Dynamics (CFD) By Applying Deep Neural Networks (DNN)", International Communications in Heat and Mass Transfer, Aug. 2016, pp. 197-201, vol. 76, https://doi.org/10.1016/j.icheatmasstransfer.2016.05.031.

* cited by examiner

CONTROLLING A MULTIPHASE FLOW

BACKGROUND

The present invention relates generally to the field of multiphase flows, and more particularly to an approach for controlling a multiphase flow configured to create a plurality of particles.

The Size Distribution (SD) of particles in materials (such as fluid drops and bubbles in a liquid) is an important parameter in many natural and industrial processes. Accurate knowledge of SD is commonly required in order to optimize operations and manage risks in different scenarios (ranging from chemical industry or waste-water treatment plants through to 3D/inkjet printing or microbubble cleaning systems).

By way of example, when injecting a fluid into another medium, the generated fluid drops drive the physical processes in a given spatial domain via heat, chemical or mass transfer. Different processes require different particle SDs in order for a target physical process to occur. Furthermore, the required/target particle sizes typically depend on a sensitive trade-off between multiple constraining criteria. For instance: oxygenation may require fine bubbles for better oxygen transfer, but the bubbles cannot be so small that they would dissolve too quickly; and inhalation-based drug delivery typically requires small drops that can be easily inhaled, but not so small that evaporation is instantaneous.

Furthermore, in natural or accidental processes, knowledge of the particle SD of a released fluid under uncontrolled conditions may be important for taking the appropriate remedial actions. For example, in oil and gas spills scenario, knowing the particle SD can provide valuable information about plume characteristics and dispersion.

There are many unknown aspects and challenges associated with measuring/observing the distribution of size (and other spatial properties) of particles.

SUMMARY

Aspects of an embodiment of the present invention disclose a method, computer program product, and computing system for controlling a multiphase flow configured to create a plurality of particles. A processor obtains images of a plurality of particles in a multiphase flow. A processor provides the images to a neural network adapted to determine a distribution of a spatial property of the plurality of particles from the provided images. A processor determines the distribution of the spatial property of the plurality of particles in the multiphase flow, based on the provided images, using the neural network. A processor controls the multiphase flow based on the determined distribution.

DETAILED DESCRIPTION

Figure 1:
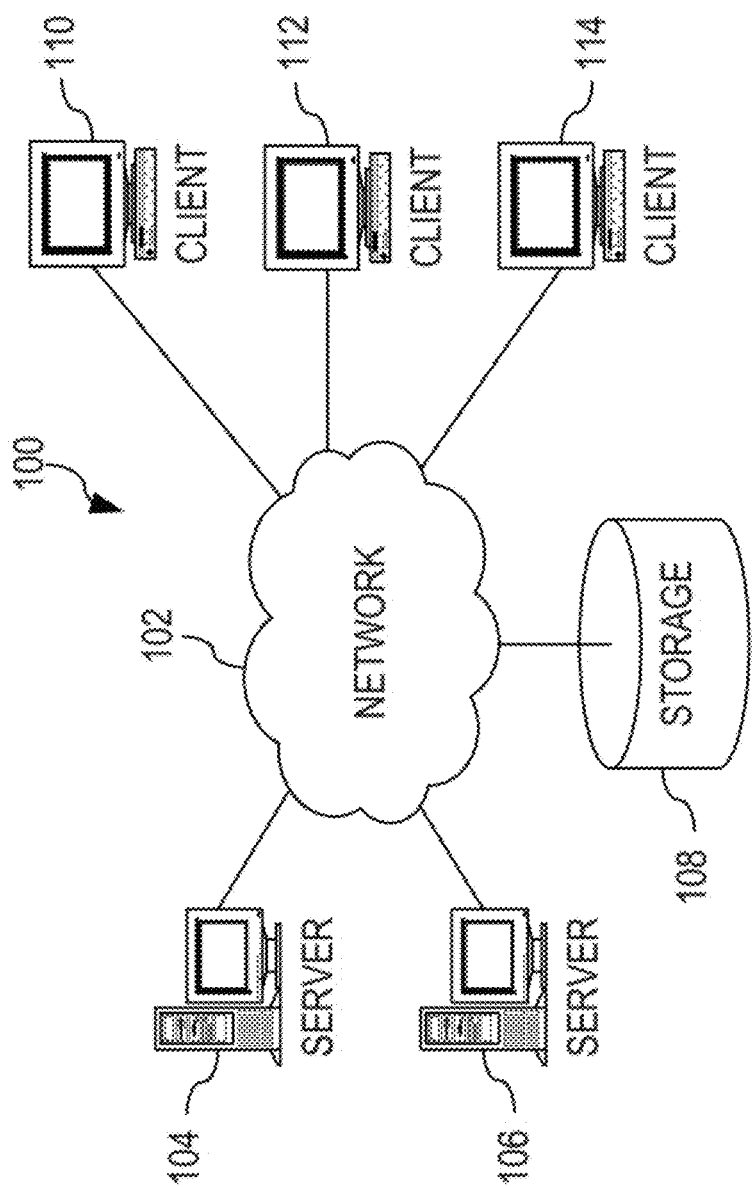
FIG. 1 is a functional block diagram illustrating a distributed data processing environment, in accordance with an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Embodiments of the present invention recognize that substantial challenges remain in applying existing techniques in order to modify and control the distribution of spatial properties of particles (e.g., so as to adhere to a requirement or target). For example, there are issues relating to object transparency and objects overlapping. Also, particles (such as liquid drops or bubbles) may deform depending on various factors (such as surface tension, presence of contaminants, material properties, etc.).

Proposed are concepts for modifying or controlling a distribution of a spatial parameter of particles which employ neural networks trained using synthetic data. Data from a real process that creates particles within a liquid or gaseous medium may, for example, be provided as an input the trained neural network which then generates an inference result (or prediction) that can be used to modify and/or control the real process.

For example, images of a plurality of particles in a multiphase flow may be provided to a neural network. Based on the provided images, the neural network may then determine the distribution of a spatial property of the plurality of particles in the multiphase flow. The multiphase flow can then be modified or controlled according to the determined distribution.

Reference to particles should be taken to refer to particles that may be suspended in a liquid or gaseous medium and which results from natural or industrial processes. For instance, particles may be droplets, bubbles or solid particles, and particles may be of regular or irregular shape. By way of further example, particles may comprise globules of liquid or gas (e.g. droplets of liquid in gas, or bubbles of in a liquid).

Also, reference to neural networks should be taken to refer to any type of inference network or connectionist system comprising a collection of simulated neurons (or 'nodes') that may be configured or trained (using training data or examples) to generate inferences or predictions from input data. Such neural networks may be otherwise referred to as artificial neural networks. Many types of neural networks are currently known, such as: convolutional neural networks; and competitive networks such as generative adversarial networks. Other types of neural networks are known and it is to be expected that variations to known types of neural networks will be developed, in addition to entirely new/different types of neural networks. It should therefore be appreciated that, although it certain types of neural network may be better suited for use in proposed embodiments, the proposed concepts may make use of any type of neural network.

Proposed are concepts that may facilitate the control of multiphase flow processes which create a distribution of particles in a medium. Such concepts may not only enable a user to observe a distribution of a spatial property of a plurality of particles but may also enable modification or control of the distribution of that spatial property. Embodiments may thus facilitate control of the distribution of a spatial property of particles in a real two-phase flow process, e.g. so as to meet a predetermined requirement and/or achieve a target or optimal value.

By way of example, according to a proposed embodiment, there may be provided a digital twin system for controlling a multiphase flow in a sequential framework. The embodiment may automatically generate synthetic twin data and image representations of a real processes or experiment, and this data may then be provided to a convolutional neural network (CNN) for determining of a size distribution of the particles. This may avoid a need for approximation, shape or bias correlation to reduce effects such as distortion. The CNN may then be applied for information extraction which can be used control real, physical processes and experiments with a high level of accuracy. For example, given a certain size distribution of particles, a user may be able to modify or control processes towards are target or optimal value.

Accordingly, embodiments may not only analyze an observed two-phase flow process, but may also optimize the size distribution of fluid drops or bubbles created by the process. This may be done by matching complicated fluid drop shapes with their simulation-based object representations.

Proposed embodiments may address drawbacks of current techniques, such as biases produced by distortion or 2D/3D reconstruction approaches, by circumventing a need for approximation or shape correlation.

Accordingly, the inventors propose concepts for determining and controlling the distribution of one or more properties of particles created by a multiphase flow. In particular, such concepts may include generating synthetic data indicative of particles based on parameters of a process and generating a visual representation (e.g. digital image) of the particles based on the synthetic data. A neural network may then be trained using the generated data. The trained neural network may then be provided with captured images of particles created by a multiphase flow. Based on the captured images, the neural network may infer or predict a distribution of a spatial property of particles of the multiphase flow, and this may then be used to modify or control the distribution of the spatial property of particles. Such proposed approaches may therefore facilitate automatic labeling/annotation of captured images from which a distribution of a spatial property may be determined.

By way of example, the spatial property may comprise at least one of a particle size, a particle surface area, and a distance between particles. In this way, proposed embodiments may be used to modify or control the distribution of various different space properties of particles of a multiphase flow. Thus, although embodiments described below may relate to the size distribution of particles, alternative embodiments may be equally applicable to other characteristics of particles, such as particle surface area for instance.

In a proposed embodiment, controlling the multiphase flow may comprise comparing the determined distribution of the spatial property against a predetermined requirement. The step may further comprise, responsive to meeting the predetermined requirement, maintaining the multiphase flow, and, responsive to not meeting the predetermined requirement, adjusting at least one operating parameter of the multiphase flow. Embodiments may therefore be configured so as to facilitate the optimization of the distribution. Unlike conventional approaches that may be limited to only providing a delayed and simple understanding particles from a multi-phase flow, embodiments may provide for the generation of real-time information that can be used to control a multi-phase flow to adhere to a target distribution value.

In some embodiments, an operating parameter of the multiphase flow may comprise at least one of a flow rate, a temperature, a viscosity, a density, a mass concentration, and a pressure. Various different aspects or operational parameters of the multiphase flow may therefore be leveraged in order to modify or control the distribution of the spatial property. Flexible and/or accurate modification and/or control concepts may therefore be facilitated by proposed embodiments.

In some embodiments, determining the distribution of the spatial property of the plurality of particles in the multiphase flow based on the provided images may comprise identifying each of the plurality of particles in the provided images. This may further comprise classifying each of the identified plurality of particles according to their spatial property and determining the distribution of the spatial property of the classified plurality of particles.

In some embodiments, obtaining images of the plurality of particles in the multiphase flow may comprise at least one of capturing live images of the plurality of particles in the multiphase flow and generating synthetic images of the plurality of particles in the multiphase flow. In some embodiments, generating synthetic images of the plurality of particles in the multiphase flow may comprise generating a set of synthetic data representing the multiphase flow and generating synthetic images representative of the plurality of particles in the multiphase flow based on the generated set of synthetic data.

In some embodiments, the set of synthetic data representing the multiphase flow may comprise at least simulated object representing at least one of the plurality of particles in the multiphase flow.

By way of further example, generating the set of synthetic data representing the multiphase flow may comprise generating a virtual model of the multiphase flow and generating the set of synthetic data based on the virtual model.

Accordingly, embodiments may avoid any change or adaptation of neural networks, but may instead provide for automatically labeling/annotating the images (based on simulations, i.e. synthetic images). For example, this may be done by making a virtual representation of the process and rendering at least two types of time series images: one mimicking the "real-world" and other one with a colormap representing the real size. As the images are obtained, an algorithm may automatically classify the particles from a known colormap. A CNN (e.g. a R-CNN-type network) can then be provided with the classifications and "real-world" images for training purposes.

In some embodiments, generating the virtual model of the multiphase flow may comprise determining at least one of a property of the multiphase flow and/or a property of an environment of the multiphase flow, and generating the virtual model based on the at least one determined property. For example, the property of the multiphase flow may comprise at least one of a flow rate, a temperature, a viscosity, a density, a mass concentration, and a pressure. Various different aspects or parameters may therefore be employed for modeling the multiphase flow. Flexible and/or accurate modeling concepts may therefore be facilitated which can, for instance, provide improved understanding of how operation of a multiphase flow may need to be modified and/or controlled so as to meet a predetermined requirement or target value.

In some embodiments, the property of the environment of the multiphase flow may comprise at least one of an intensity of light in the flow environment, a frequency of the light in the flow environment, a wavelength of the light in the flow environment, a material property of the flow environment, an optical property of a camera used to generate the virtual model. Various different aspects or parameters may therefore be employed for modeling the multiphase flow. Accurate modeling may therefore be facilitated which can, for instance, provide improved understand of how an environment of the multiphase flow may need to be modified and/or controlled so as to meet a predetermined requirement or target value.

In some embodiments, the neural network may comprise a convolutional neural network. In this way, a known neural network may be leveraged for ease of implementation. Nonetheless, it is to be appreciated other types of neural networks may be employed by proposed embodiments.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first server 104 and second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
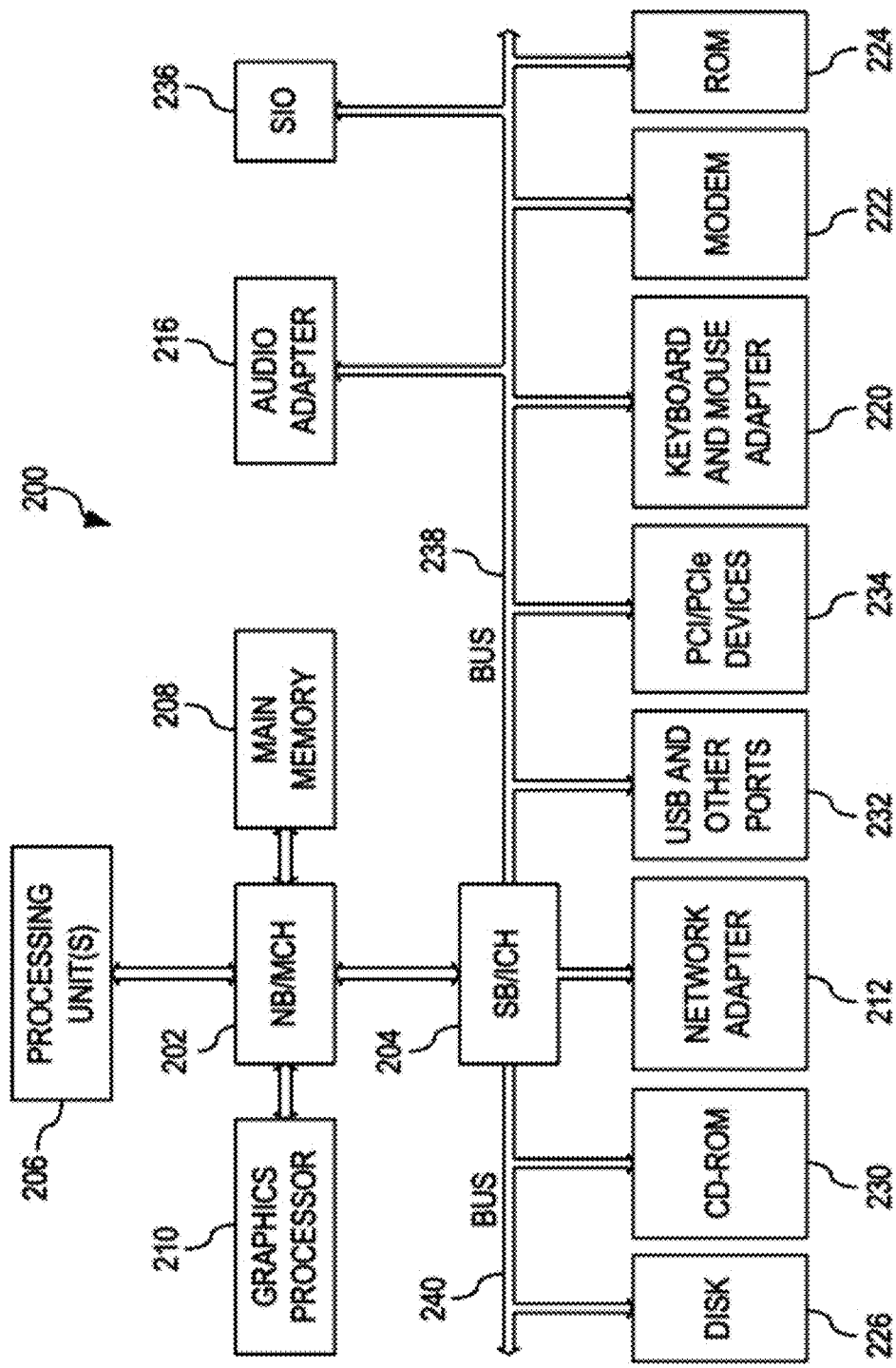
FIG. 2 is a block diagram of components of an example system corresponding to devices of the distributed data processing environment, in accordance with an embodiment of the present invention.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement an image obtaining unit, an image provision unit and a flow control unit according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system may run in conjunction with the operating system and provides calls to the operating system from programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
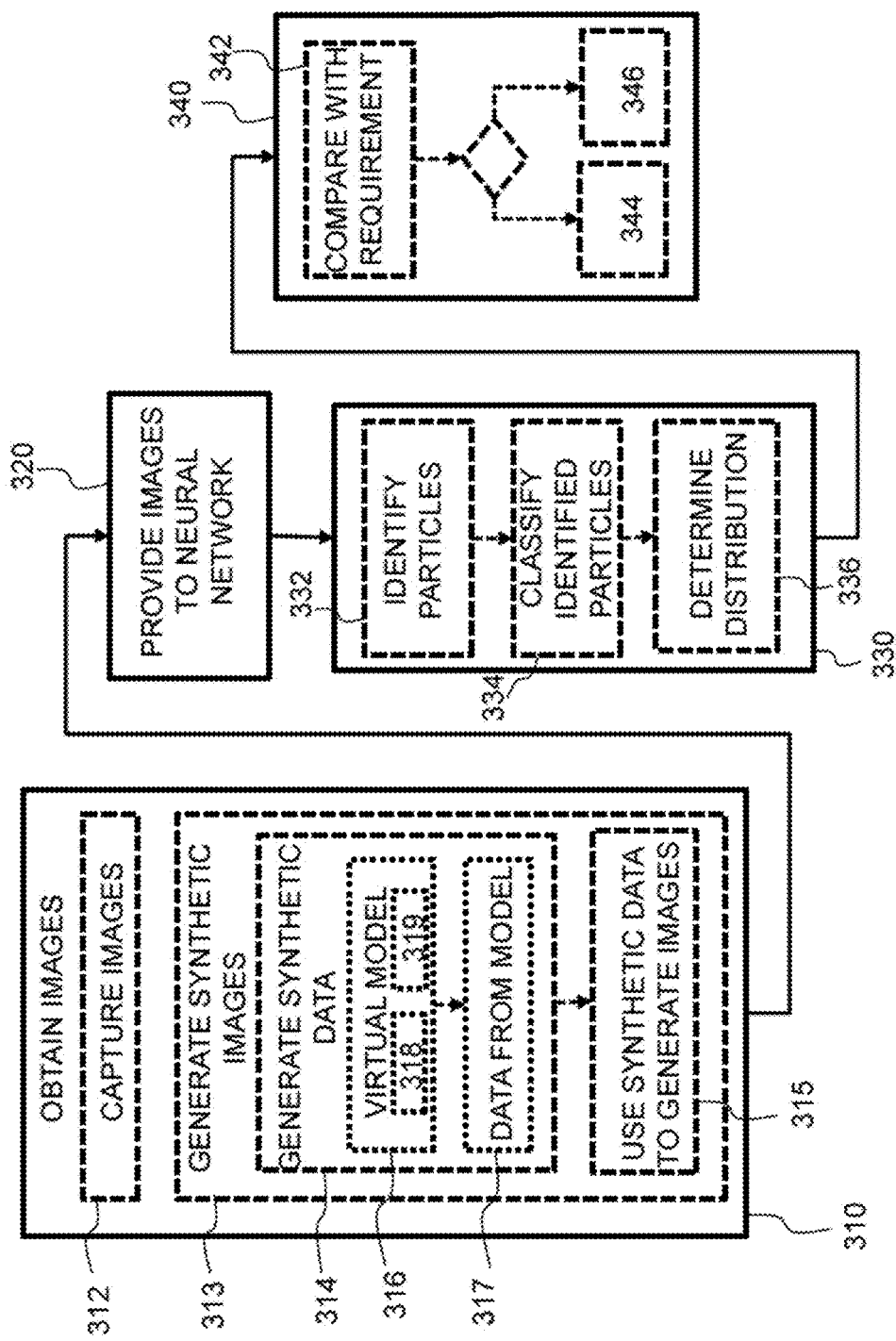
FIG. 3 is a flow diagram of an approach for controlling a multiphase flow configured to create a plurality of particles, in accordance with an embodiment of the present invention.

Referring now to FIG. 3, there is depicted a flow diagram of a proposed computer-implemented method for controlling a multiphase flow configured to create a plurality of particles.

The method begins with step 310. Step 310 comprises obtaining images of a plurality of particles in a multiphase flow. More specifically, the process of obtaining images of particles in a multiphase flow comprises at least one of steps 312 and 313.

Step 312 comprises capturing live images of the plurality of particles in the multiphase flow. For instance, a camera can be employed to capture a video stream formed of captured images of the multiphase flow. Such captured images therefore provide a visual representation of actual particles created by the multiphase flow.

Step 313 comprises generating synthetic images of the plurality of particles in the multiphase flow. More specifically, in this embodiment, step 313 of generating synthetic images comprises (step 314) generating a set of synthetic data representing the multiphase flow; and (step 315) generating synthetic images representative of the plurality of particles in the multiphase flow based on the generated set of synthetic data.

In more detail, the generated set of synthetic data comprises one or more simulated objects representing one or more particles in the multiphase flow. For this, (step 314) generating the synthetic data comprises generating a virtual model of the multiphase flow (step 316) and then generating the set of synthetic data based on the virtual model (step 317). In this example, the process of generating a virtual model includes two sub-steps of: (318) determining at least one of a property of the multiphase flow and/or a property of an environment of the multiphase flow; and then (319) generating the virtual model based on the at least one determined property.

By way of example, the property of the multiphase flow may be one or more of: a flow rate; a temperature; a viscosity; a density; a mass concentration; and a pressure. Also, the property of the environment of the multiphase flow may be one or more of: an intensity of light in the flow environment; a frequency of the light in the flow environment; a wavelength of the light in the flow environment; a material property of the flow environment; and an optical property of a camera used to generate the virtual model. Thus, many different characteristics of the multiphase flow and/or the flow environment may be used for modeling the multiphase flow. This may allow flexible and/or accurate modeling. It should, however, be understood that the above detailed properties are only exemplary, and other properties may be alternatively (or additionally) accounted for when generating a virtual model for synthetic data generation.

After obtaining images in step 310, the method proceeds to step 320 of providing the images to a neural network. In this example, the neural network comprises a convolutional neural network that is adapted to determine a distribution of a spatial property of the plurality of particles from the provided images. More specifically, the spatial property comprises at least one of a particle size, a particle surface area, and a distance between particles.

Using the neural network, a distribution of the spatial property of the particles is then determined in step 320. In this proposed embodiment, step 320 of determining the distribution of spatial property comprises a plurality of sub-steps 332, 334 and 336. In more detail, the process of step 320 begins with step 332 of identifying each of the plurality of particles in the provided images. Next, in step 334, each of the identified plurality of particles is classified according to its spatial property. This may, for example, comprising binning or grouping each of the identified particles into one of a plurality of bins/groups (that may be pre-defined or dynamically defined based on the range of values of the spatial property for the identified particles). Finally, in step 336, the distribution of the spatial property of the classified particles is determined.

Based on the determined distribution, the multiphase flow is then controlled in step 340. By way of example, control of the multiphase flow may be achieved by analyzing the determined distribution with respect to a predetermined requirements (that may be represented by a target or threshold value for example). For instance, in this exemplary embodiment, step 340 of this embodiment comprises sub-steps 342, 344, and 346.

In step 342, the determined distribution of the spatial property is compared against a predetermined requirement. Responsive to meeting the predetermined requirement, the existing/current operation of the multiphase flow is maintained in step 344. Conversely, responsive to not meeting the predetermined requirement, at least one operating parameter of the multiphase flow is adjusted in step 346, thereby modifying the operation of the multiphase flow (and thus modifying the distribution of the spatial property of the particles). By way of example, an operating parameter adjusted in step 346 may include at least one of: a temperature; a viscosity; a density; a mass concentration; and a pressure.

Figure 4:
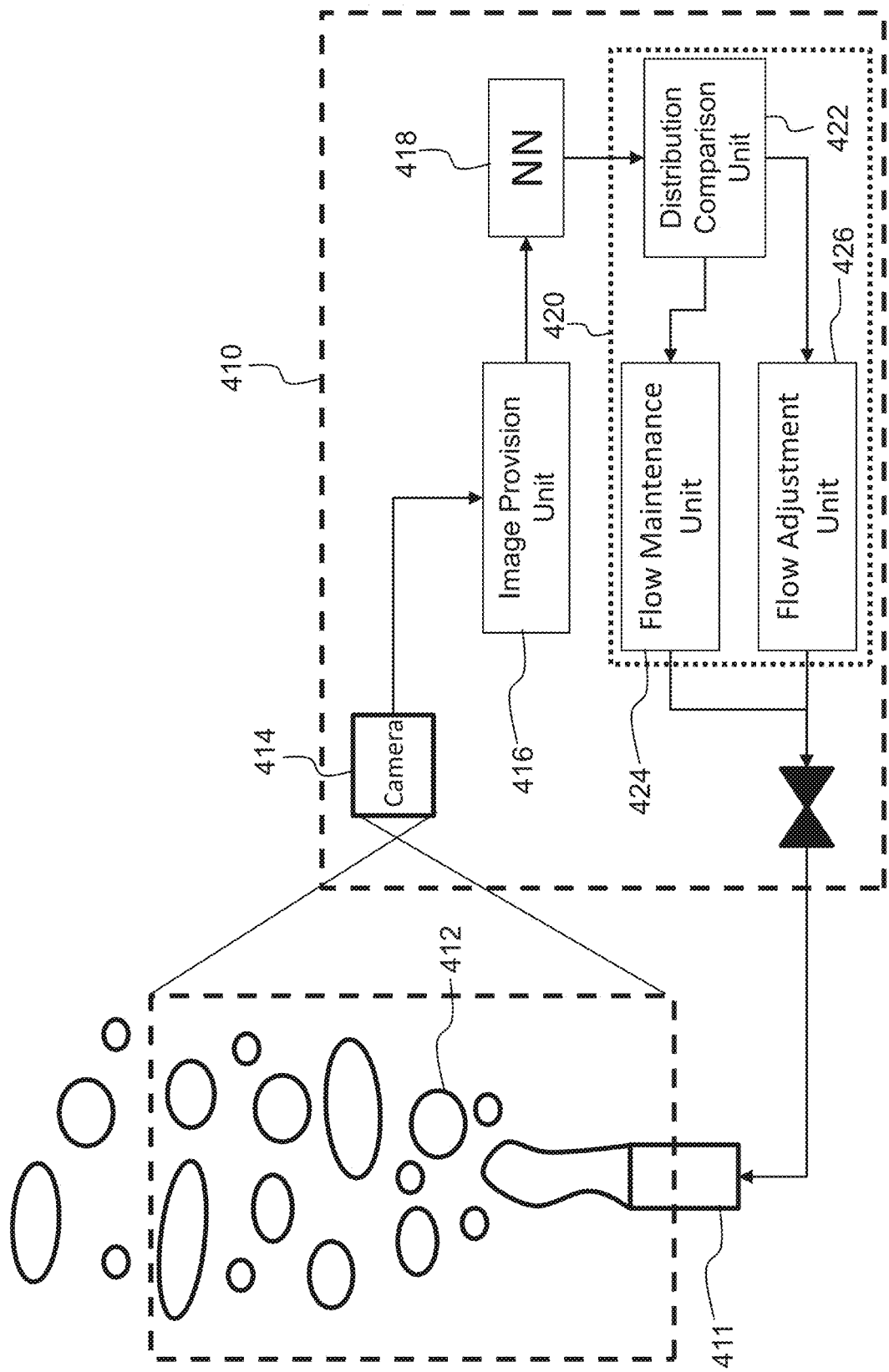
FIG. 4 is a schematic illustration of a process for oxygenation of a domain controlled by the flow-rate injection, wherein the process employs a system for controlling a multiphase flow, in accordance with an embodiment of the present invention.

Referring now to FIG. 4, an example of the proposed concept(s) will now be described with reference to an air-injection process is shown.

FIG. 4 is a simplified schematic illustration of a process for oxygenation of a domain controlled by the flow-rate injection. The process employs a system 410 for controlling a multiphase flow according to a proposed embodiment.

In the example of FIG. 4, different values of flow rate at the inlet 411 of the multiphase flow result in different oxygen levels as a function of the size distribution of air bubbles 412 formed by the multiphase flow.

Determining an optimal flow to achieve a target size distribution of the bubbles according to conventional approaches is a complex and difficult task. However, the use of a system according to proposed embodiments can significantly simplify the task of determining (and achieving) an optimal flow.

The system 410 shown in FIG. 4 includes an image obtaining unit 414 which, ins this example, comprises an image capture unit (e.g. camera) 414 that is configured to capture live images of the bubbles 412 in the multiphase flow.

An image provision unit 416 of the system 410 provides the image captured by the image capture unit to a CNN 418 of the system 410. The CNN 418 is adapted to determine a distribution of a spatial property of the bubbles 412 from the provided images. In this example, the spatial property is distance between bubbles. Thus, the distribution of the distance between bubbles 412 may, for instance, provide information relating to the concentration of bubbles 412 in the flow.

The determination made by the CNN 418 is provided to a flow control unit 420 of the system 410. The flow control unit is configured to control the multiphase flow based on the determined distribution. More specifically, the flow control unit 420 in this example comprises a distribution comparison unit 422 that is configured to compare the determined distribution of the distance between bubbles 412 against a predetermined requirement (e.g. a target value representative of a desired or preferred bubble concentration).

If the distribution of the distance between bubbles 412 meets the predetermined requirement, a flow maintenance unit 424 of the flow control unit 420 is configured to maintain the multiphase flow (e.g. by controlling one or more operating parameters of the multiphase flow, such as flow rate, temperature, viscosity, pressure, etc.)

Conversely, if the distribution of the distance between bubbles 412 does not meet the predetermined requirement, a flow adjustment unit 426 of the flow control unit 420 is configured adjust at least one operating parameter of the multiphase flow (e.g. flow rate, temperature, viscosity, pressure, etc.) so as to affect a change in the distribution of the distance between bubbles 412

Although the embodiment of FIG. 4 described above employs image capture unit, other embodiments may generate a virtual model of the process using a computational simulation solver, a ray-tracing render engine, and a machine learning model. Such a virtual model comprises a simulation that replicates the process and generates 3D synthetic data, and images can be rendered which mimic the real camera acquisition. Such images may then act as the training set for the CNN. As described above for the embodiment of FIG. 4, then CNN inference(s) can then be applied to the real/captured images so as to determine the distribution of the distance between bubbles 412.

The CNN may, for example, have its input as 2D objects with a 3D representation. A loss function employed can be a simple loss regression between the metrics representing the images, or other distributional measure such as Kullback-Leibler divergence to optimize over the whole size distribution.

Figure 5:
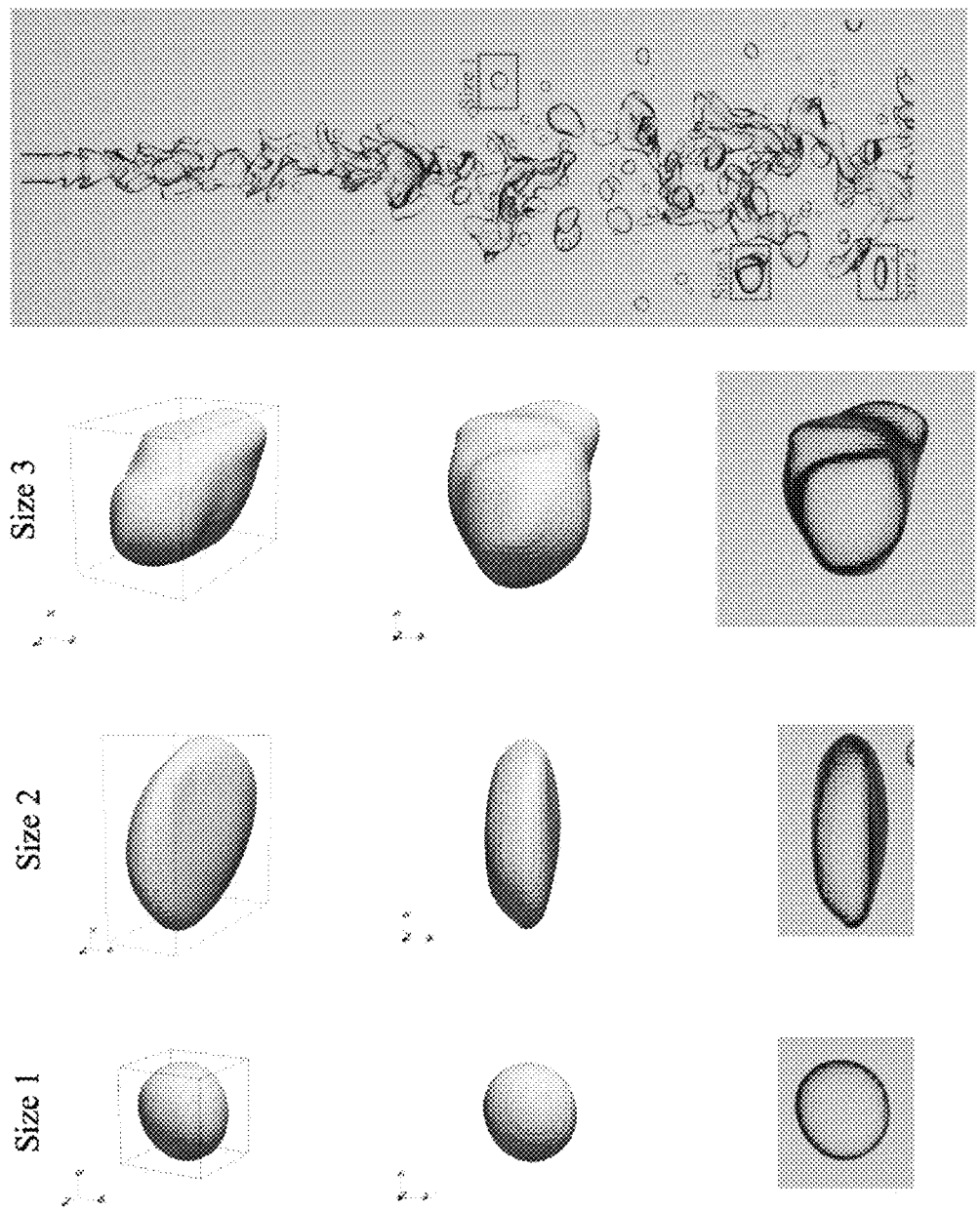
FIG. 5 is an example of data from simulations, describing the 3D view, the 2D projection and the photorealistic rendering applied, in accordance with an embodiment of the present invention.

For instance, FIG. 5 shows an example of data from simulations, describing the 3D view, the 2D projection and the photorealistic rendering applied.

Because size distributions can be extracted by proposed embodiments for example, a flow rate can be adjusted in real-time with the goal of achieving target values for operating parameters.

Exemplary embodiments, such as those described above, can be applied online (e.g. via the Internet or a distributed processing environment) so that a multiphase flow and associated control system receives feedback in real time for controlling the operation (of the flow and/or the control system).

Figure 6:
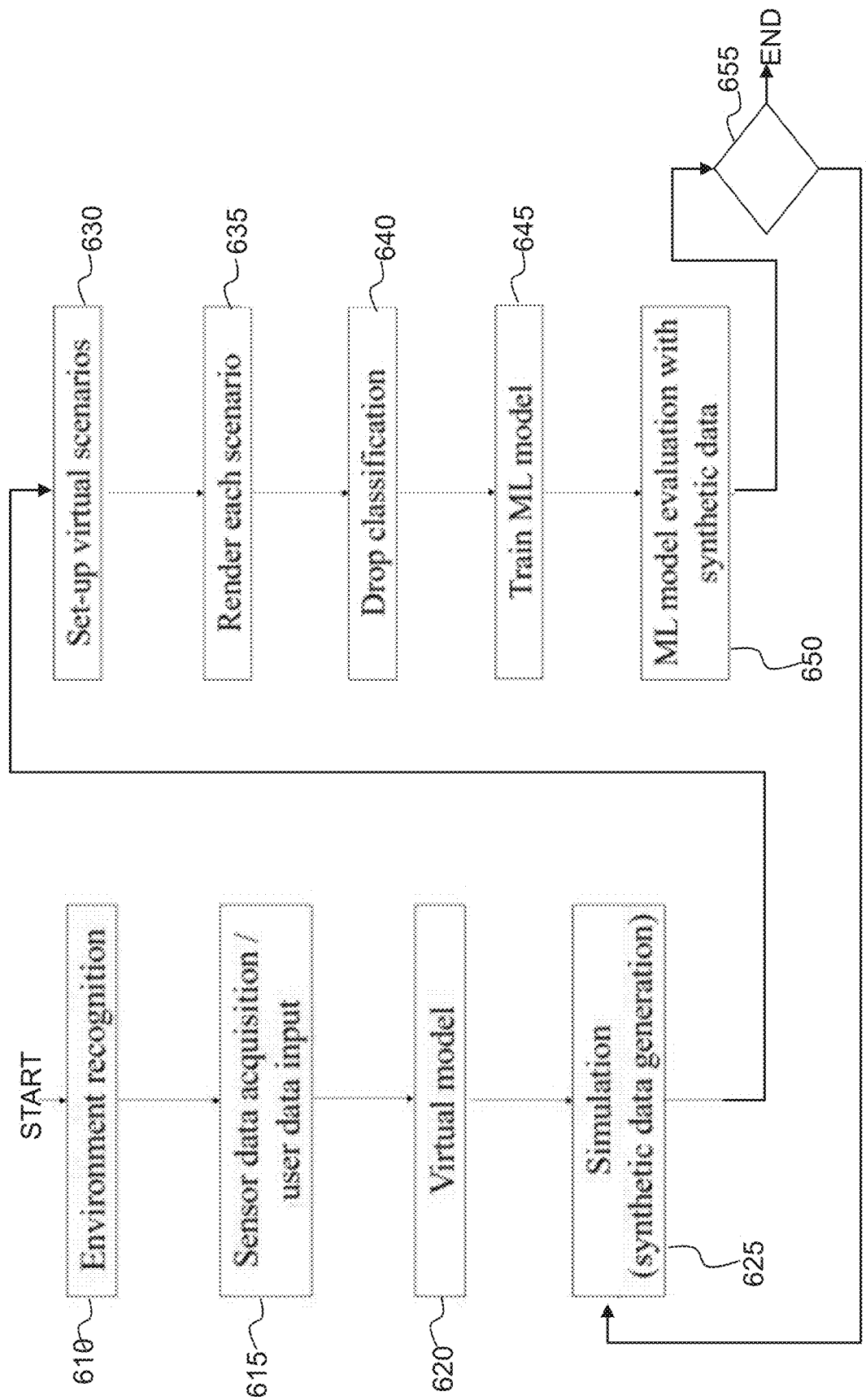
FIG. 6 is a flowchart of a approach performed by the system of FIG. 4, in accordance with an embodiment of the present invention.

A flow diagram of an exemplary method performed by the system of FIG. 4 is illustrated in FIG. 6.

The method begins with the reconnaissance of the environment in step 610. Recognition of the environment is used to determine model geometry. Next, in step 615, data acquisition is undertaken so as to acquire data about the multiphase flow, such as fluid properties, materials, lighting and camera characteristics. This data may be acquired from sensors and/or user inputs.

The acquired data is used for creating the virtual model in step 620.

Based on this model, a computational fluid dynamics solver is executed for a set of inlet and outlet conditions and generates a set of synthetic data. This data is passed to a ray tracing engine with a virtual model, with a number of scenarios based on different light conditions. As a result, a set of images are generated and fed to a CNN. Specifically, a number of virtual scenarios for the multiphase flow are defined in step 630, and then each scenarios is rendered in step 635. The rendered images are processed so as to classify the different drops in the images according to their 3D computed size.

The processed and classified images are then used to train the model in step 645.

Evaluation of the trained model is then undertaken with unseen images in step 650. Such evaluation measures the accuracy with the reference 3D data. In step 655, the evaluation results (i.e. determined accuracy) is then assessed to decide if the model is ready to be applied or more synthetic data from the simulation or rendering steps are needed. If the evaluation indicates that the model is ready, the method ends. Conversely, if it more synthetic data is required, the method returns to step 625, wherein further synthetic data is generated.

Figure 7:
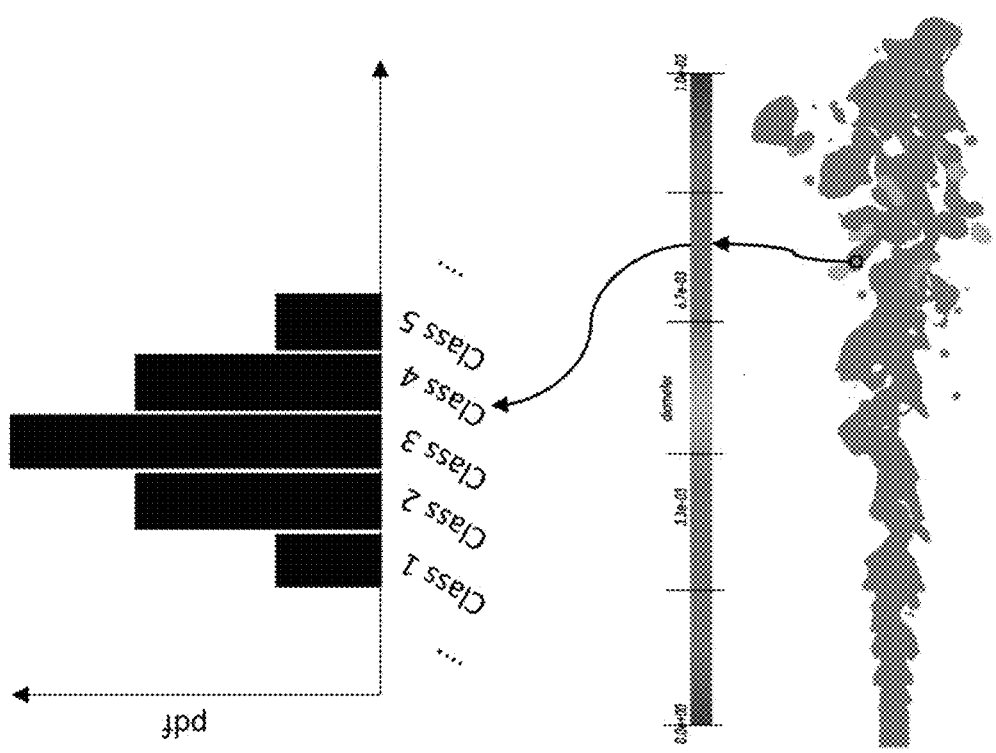
FIG. 7 is a size distribution discretized in a fixed number of ranges which define object classes, in accordance with an embodiment of the present invention.
Figure 8:
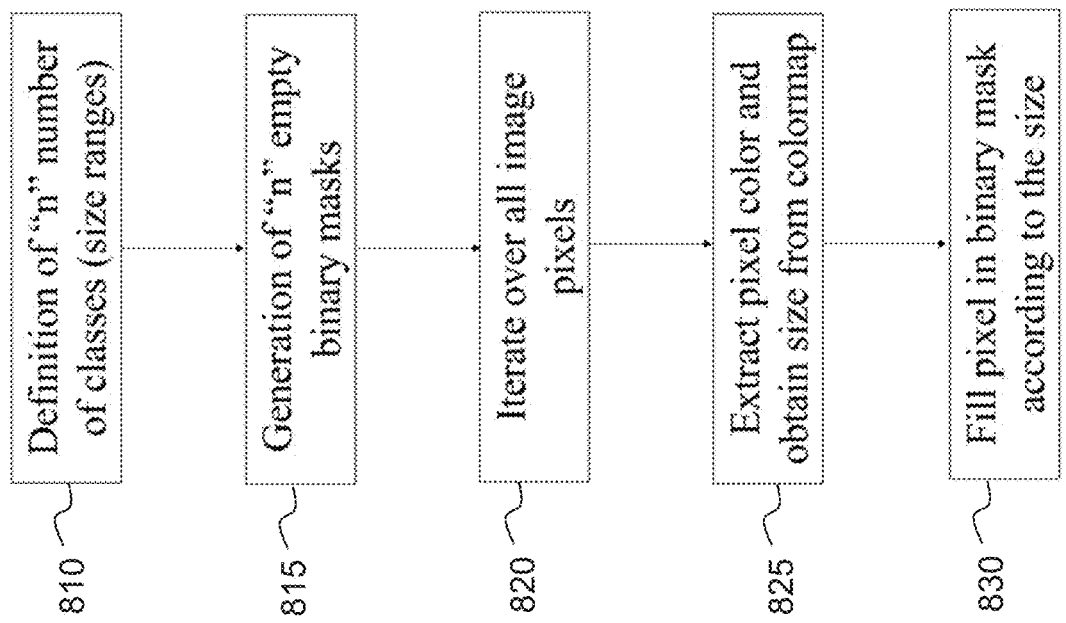
FIG. 8 is a flowchart of an approach of the drop classification process described in FIG. 6, in accordance with an embodiment of the present invention.

By way of further example and explanation, an exemplary drop classification process for step 645 of the method of FIG. 6 is illustrated in FIGS. 7 and 8.

FIG. 7 illustrates a size distribution discretized in a fixed number of ranges which define the object classes. Here, five classes are shown purely by way of example.

The drop classification is performed, and a reference image is obtained, wherein different drop-size classes are colored differently. Aside from the colors, the processed and classified reference image is the same as the photorealistic one, and is used for classifying the drops and creating a mask for each class.

In this way, the images passed to the CNN are the photorealistic images and the classified images.

FIG. 8 depicts a flow diagram of the drop classification process for step 645 of the method of FIG. 6. The method begin with step 810 of defining the number n of classes. Here, the classes are defined such that each class corresponds to a respective range of sizes, wherein the ranges are non-overlapping. After the number of classes is chosen in step 810, the empty binary masks are generated for each class in step 815. An iteration over all pixels is then performed on a reference image in step 820, and, according to its color and the underlying colormap, the size range of each pixel is calculated assigned to its corresponding class in step 825. A pixel mask is then filled in each pixel according to its size classification in step 830.

Figure 9:
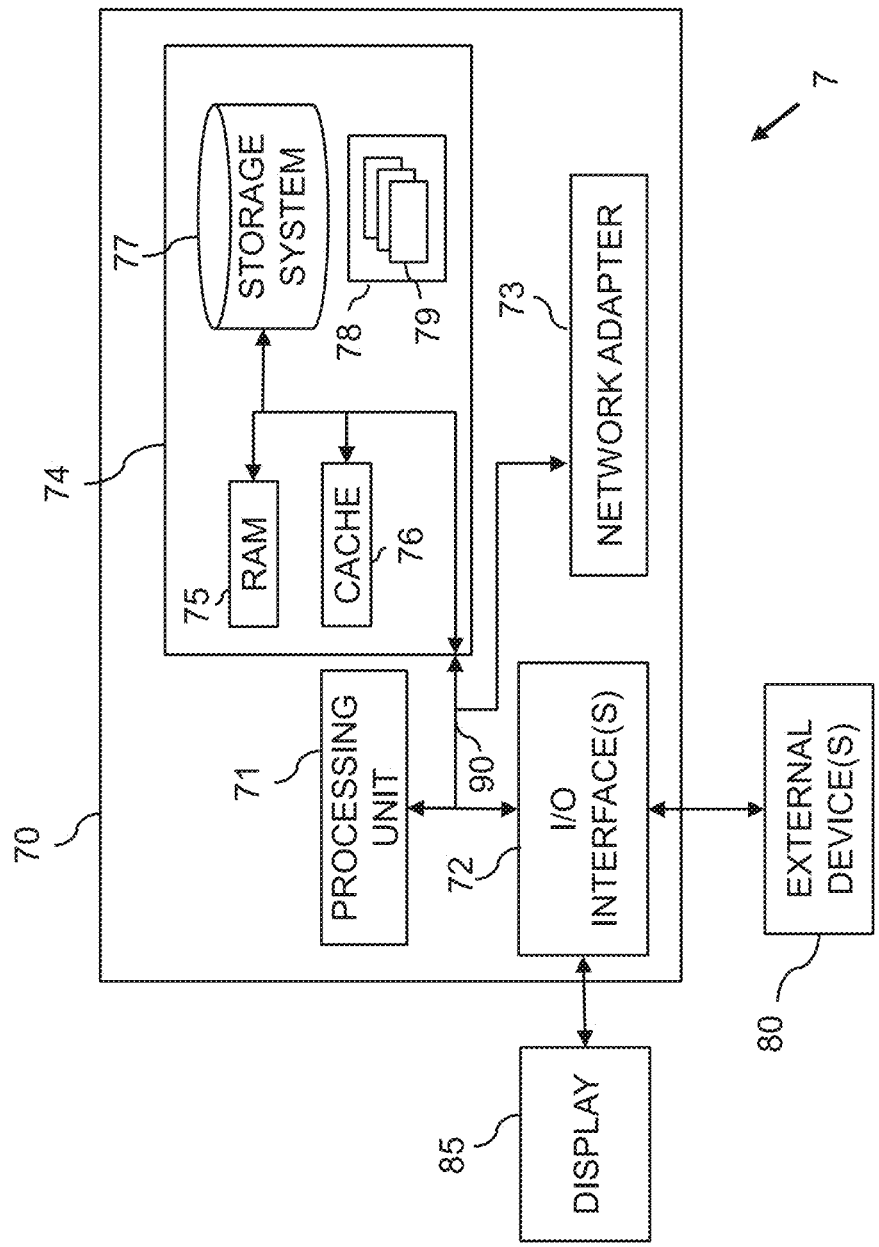
FIG. 9 is a block diagram of an example system in which aspects of embodiments of the present invention may be implemented.

By way of further example, as illustrated in FIG. 9, embodiments may comprise a computer system 70, which may form part of a networked system 7. For instance, a flow adjustment unit may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform a method for controlling a multiphase flow configured to create a plurality of particles.

Program/utility 78, having a set (at least one) of program modules 79, may be stored in memory 74. Program modules 79 generally carry out the functions and/or methodologies of proposed embodiments for describing an impact of a change in source code on a trace.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method.

The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, by one or more processors, real-time images of a plurality of particles in a multiphase flow;
   providing, by one or more processors, the images to a neural network adapted to determine a distribution of spatial properties of the plurality of particles from the provided images;
   determining, by one or more processors, the distribution of the spatial properties of the plurality of particles in the multiphase flow, based on the provided images, using the neural network;
   determining, by one or more processors, that the determined distribution fails to meet a spatial property distribution requirement; and
   responsive to determining that the determined distribution fails to meet the spatial property distribution, adjusting, by one or more processors, a flow control unit of a system to change one or more operating parameters of the multiphase flow until the distribution of the spatial properties of the plurality of particles meets the spatial property distribution.

2. The computer-implemented method of claim 1, wherein the spatial property distribution requirement is based on a selection from the group consisting of: particle size, particle surface area, and distance between particles.

3. The computer-implemented method of claim 1, wherein the operating parameter of the multiphase flow is selected from the group consisting of: a flow rate, a temperature, a viscosity, a density, a mass concentration, and a pressure.

4. The computer-implemented method of claim 1, wherein determining the distribution of the spatial properties of the plurality of particles in the multiphase flow based on the provided images comprises:
   identifying, by one or more processors, each of the plurality of particles in the provided images;
   classifying, by one or more processors, each of the identified plurality of particles according to spatial property; and
   determining, by one or more processors, the distribution of the spatial property of the classified plurality of particles.

5. The computer-implemented method of claim 1, wherein obtaining real-time images of the plurality of particles in the multiphase flow comprises generating, by one or more processors, synthetic images of the plurality of particles in the multiphase flow.

6. The computer-implemented method of claim 5, wherein generating the synthetic images of the plurality of particles in the multiphase flow comprises:
   generating, by one or more processors, a set of synthetic data representing the multiphase flow; and
   generating, by one or more processors, synthetic images representative of the plurality of particles in the multiphase flow based on the generated set of synthetic data.

7. The computer-implemented method of claim 6, wherein the set of synthetic data representing the multiphase flow comprises at least one simulated object representing at least one of the plurality of particles in the multiphase flow.

8. The computer-implemented method of claim 6, wherein generating the set of synthetic data representing the multiphase flow comprises:
generating, by one or more processors, a virtual model of the multiphase flow; and
generating, by one or more processors, the set of synthetic data based on the virtual model.

9. The computer-implemented method of claim 8, wherein generating the virtual model of the multiphase flow comprises:
determining, by one or more processors, a property selected from the group consisting of: a property of the multiphase flow and a property of an environment of the multiphase flow; and
generating, by one or more processors, the virtual model based on the determined property.

10. The computer-implemented method of claim 9, wherein the property of the multiphase flow comprises a selection from the group consisting of: a flow rate, a temperature, a viscosity, a density, a mass concentration, and a pressure.

11. The computer-implemented method of claim 9, wherein the property of the environment of the multiphase flow comprises a selection from the group consisting of: an intensity of light in the flow environment, a frequency of the light in the flow environment, a wavelength of the light in the flow environment, a material property of the flow environment, and an optical property of a camera used to generate the virtual model.

12. The computer-implemented method of claim 1, wherein the neural network comprises a convolutional neural network.

13. The method of claim 1, wherein determining the distribution of the spatial properties of the plurality of particles in the multiphase flow, based on the provided images, using the neural network comprises:
identifying, by one or more processors of the neural network, each of the plurality of particles;
classifying, by one or more processors of the neural network, each identified particle of the plurality of particles according to a respective spatial property; and
determining the distribution of the spatial properties of the classified particles based on the classifications of the plurality of particles.

14. A computer program product comprising:
one or more computer readable storage media, and program instructions collectively stored on the one or more computer readable storage media, the program instructions comprising:
program instructions to obtain real-time images of a plurality of particles in a multiphase flow;
program instructions to provide the images to a neural network adapted to determine a distribution of spatial properties of the plurality of particles from the provided images;
program instructions to determine the distribution of the spatial properties of the plurality of particles in the multiphase flow, based on the provided images, using the neural network;
program instructions to determine that the determined distribution fails to meet a spatial property distribution requirement; and
program instructions, responsive to determining that the determined distribution fails to meet the spatial property distribution, to adjust a flow control unit of a system to change one or more operating parameters of the multiphase flow until the distribution of the spatial properties of the plurality of particles meets the spatial property distribution.

15. The computer program product of claim 14, wherein the spatial property distribution requirement is based on a selection from the group consisting of: particle size, particle surface area, and distance between particles.

16. The computer program product of claim 14, wherein the operating parameter of the multiphase flow is selected from the group consisting of: a flow rate, a temperature, a viscosity, a density, a mass concentration, and a pressure.

17. The computer program product of claim 14, wherein program instructions to determine the distribution of the spatial properties of the plurality of particles in the multiphase flow based on the provided images comprise:
program instructions to identify each of the plurality of particles in the provided images;
program instructions to classify each of the identified plurality of particles according to spatial property; and
program instructions to determine the distribution of the spatial property of the classified plurality of particles.

18. The computer program product of claim 14, wherein program instructions to obtain real-time images of the plurality of particles in the multiphase flow comprise program instructions to generate synthetic images of the plurality of particles in the multiphase flow.

19. A computer system comprising:
one or more computer processors, one or more computer readable storage media, and program instructions collectively stored on the one or more computer readable storage media for execution by at least one of the one or more computer processors, the program instructions comprising:
program instructions to obtain real-time images of a plurality of particles in a multiphase flow;
program instructions to provide the images to a neural network adapted to determine a distribution of spatial properties of the plurality of particles from the provided images;
program instructions to determine the distribution of the spatial properties of the plurality of particles in the multiphase flow, based on the provided images, using the neural network; program instructions to determine that the determined distribution fails to meet a spatial property distribution requirement; and
program instructions, responsive to determining that the determined distribution fails to meet the spatial property distribution, to adjust a flow control unit of a system to change one or more operating parameters of the multiphase flow until the distribution of the spatial properties of the plurality of particles meets the spatial property distribution.

* * * * *